US011605311B2

(12) United States Patent
Trevino et al.

(10) Patent No.: US 11,605,311 B2
(45) Date of Patent: Mar. 14, 2023

(54) TRAINING PROSTHETIC FOR SELF-CANNULATION TRAINING

(71) Applicant: Fresenius Medical Care Holdings, Inc., Waltham, MA (US)

(72) Inventors: Samuel Trevino, San Ramon, CA (US); Daniel L. Sloat, Wakefield, MA (US); Mary Vasseur Finn, Ayer, MA (US); Derek S. Merrikin, Nashua, NH (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 300 days.

(21) Appl. No.: 17/082,573

(22) Filed: Oct. 28, 2020

(65) Prior Publication Data

US 2022/0130279 A1 Apr. 28, 2022

(51) Int. Cl.
*G09B 23/28* (2006.01)
*G09B 23/30* (2006.01)

(52) U.S. Cl.
CPC ......... *G09B 23/285* (2013.01); *G09B 23/303* (2013.01)

(58) Field of Classification Search
CPC .............................. G09B 23/285; G09B 23/303
See application file for complete search history.

(56) References Cited

U.S. PATENT DOCUMENTS

| 5,112,228 A | 5/1992 | Zouras |
| 5,839,904 A | 11/1998 | Bloom |
| 8,690,580 B2 | 4/2014 | Paronen |

(Continued)

FOREIGN PATENT DOCUMENTS

| JP | 2010210710 A | 9/2010 |
| KR | 102052037 B1 | 12/2019 |

OTHER PUBLICATIONS

Form PCT/ISA/237, Written Opinion of the International Searching Authority for PCT Application No. PCT/US20210053876, dated Feb. 3, 2022.

(Continued)

*Primary Examiner* — Robert P Bullington
(74) *Attorney, Agent, or Firm* — Kilyk & Bowersox, P.L.L.C.

(57) ABSTRACT

A self-cannulation training system is provided that includes a cannulation pad, a simulated access, a simulated cannula, a control unit, and first and second indicators. The cannulation pad includes conductors for a cannulation electrical circuit and an infiltration electrical circuit. An insulating layer electrically insulates the conductors from one another. The simulated access connects to the cannulation electrical circuit and includes an electrically conductive material retained inside an outer sheath. The simulated cannula has an electrical conductor and connects to the control unit. The control unit has a power source that connects to both the cannulation electrical circuit and to the infiltration electrical circuit. The first indicator is activated when the cannula needle electrically completes the cannulation electrical circuit. The second indicator is activated when the cannula needle infiltrates and completes the infiltration electrical circuit. Methods of training a patient for self-cannulation, using the training systems, are also provided.

13 Claims, 12 Drawing Sheets

(56) References Cited

U.S. PATENT DOCUMENTS

| | | |
|---|---|---|
| 9,460,638 B2 | 10/2016 | Baker et al. |
| 2006/0129144 A1 | 6/2006 | Shin et al. |
| 2008/0269677 A1 | 10/2008 | Cull |
| 2012/0290061 A1 | 11/2012 | Meyer et al. |
| 2013/0052626 A1 | 2/2013 | Hoskins |
| 2015/0100024 A1 | 4/2015 | Baker et al. |
| 2017/0316719 A1* | 11/2017 | Cull ....................... G09B 23/34 |
| 2018/0158373 A1 | 6/2018 | Hendrickson et al. |

OTHER PUBLICATIONS

Form PCT/ISA/210, International Search Report for PCT Application No. PCT/US20210053876, dated Feb. 3, 2022.

Nasco, Life/form, "Hemodialysis Practice Arm LF01037U Instruction Manual" from www.mentone-educational.com.au/iv-access-injections/, (accessed Aug. 17, 2020).

Furuzono et al., "Development of a self-cannulation support device for home hemodialysis", Department of Bioengineering, Advanced Medical Engineering Center, National Cardiovascular Center Research Institute, vol. 43(3), pp. 325-328 (2010) (translation of abstract provided).

\* cited by examiner

TRAINING PROSTHETIC FOR SELF-CANNULATION TRAINING

FIELD OF THE INVENTION

The present invention relates to a training system and method for learning and practicing self-cannulation as would be needed for home hemodialysis patients.

BACKGROUND OF THE INVENTION

Self-cannulation is a huge hurdle for patients to overcome when moving into the arena of home hemodialysis. Self-cannulation is a stressful process that can take weeks or months to achieve and master. A need exists for a device that can help augment a training regimen for self-cannulation and help a patient to achieve self-cannulation sooner than would be achieved with traditional training methods. A need also exists for a training method that enables a home hemodialysis trainee to build confidence and muscle memory prior to a first real self-cannulation experience.

SUMMARY OF THE INVENTION

An objective of the present invention is to provide a training opportunity for self-cannulation as a means of building confidence and developing muscle memory prior to actual self-cannulation for home hemodialysis patients. This and other objectives are achieved according to the present invention by using the modular training system described herein. The system provides a device that produces a realistic "flash" of blood-like fluid in a simulated cannula upon proper cannulation. The system provides tactile feedback if the simulated access is improperly cannulated or infiltrated during cannulation. The system provides realistic skin-like material on outermost layers to create an illusion and feel as though the user is cannulating their own appendage. The system provides adjustable anchor-points for the simulated access to mimic a planned, existing, or potential access location and configuration in the patient's body. The system uses materials for and in the simulated access to give a trainee a realistic sensation and pressure when the simulated cannula needle is inserted into the simulated access.

The modular system can include a synthetic skin covering or overlay, for example, a layer of replaceable synthetic skin or fabric that can be anchored to other system components as a covering. The simulated skin covering can exhibit a correct resistance to puncturing by the simulated cannula needle, a material that enables a trainee or user to discern the position of a simulated access underneath the simulated skin covering, a correct skin-like stretching and movement, combinations thereof, and the like. The simulated skin covering can comprise a material that enables a trainee or user to see a bulge, highlights, and shadows caused by an underlying simulated access so that the trainee or user can visibly identify where the simulated access is located underneath the simulated skin covering. The simulated skin covering can exhibit a skin tone color to match the skin color of the trainee.

The simulated access can be made from actual graft material, or a reasonable facsimile, to produce a realistic cannulating experience. The simulated cannula can comprise flexible conductive wires and can mimic standard hemodialysis cannulation needles. The cannulation pad can comprise an underlying, protective, highly puncture-resistant layer, anchor, or shielding that prevents a trainee or user from stabbing himself or herself. The system can include a flexible adjustable armband in the form of a stretchy closable band that wraps around a trainee's appendage enabling the trainee to attach the modular system components to the trainee's appendage. Although many embodiments described herein exemplify the system being used on a forearm, it is to be understood that embodiments of the invention are also provided for using the system on a leg or on other parts of a body, which might be viable for hemodialysis cannulation for a particular trainee.

According to the present invention, a self-cannulation training system is provided that comprises a cannulation pad, a simulated access, a simulated cannula, a control unit, and at least one indicator. The cannulation pad comprises a cannulation electrical circuit conductor, an infiltration electrical circuit conductor, and an insulating layer electrically insulating the cannulation electrical circuit conductor from the infiltration electrical circuit conductor. The simulated access is configured to be electrically connected to the cannulation electrical circuit conductor and comprises an outer sheath and an electrically conductive material retained inside the sheath. The simulated cannula has a length and comprises a cannulation needle at a first end thereof, a cannula connector at a second, opposite end thereof, and an electrical conductor extending along the length and electrically connecting the cannulation needle with the cannula connector. The control unit comprises a power source and an electrical connector for connecting the power source to both the cannulation electrical circuit conductor and to the infiltration electrical circuit conductor. The control unit also has a second electrical connector for connecting the power source to the cannula connector of the simulated cannula.

According to exemplary embodiments, the indicator is in electrical contact with the electrical conductor and is configured to be activated when the cannula needle electrically contacts the cannulation electrical circuit conductor to form a completed cannulation electrical circuit. The second indicator can be different than the first indicator and can be in electrical contact with the electrical conductor of the simulated cannula. The second indicator can be configured to be activated when the cannula needle electrically contacts the infiltration electrical circuit conductor to complete an infiltration electrical circuit. The first indicator can be, for example, a red LED and can signal that a proper cannulation of the simulated cannula into the simulated access, has taken place. The second indicator can be, for example, a buzzer and can indicate when an infiltration has taken place.

The system can include modular, replaceable, interchangeable components that can include, for example, an armband and wrist band, an arm cradle, a pair of simulated cannulas, a simulated skin covering, a replaceable battery, or a combination thereof. By using the training system, a method of training a patient or trainee for self-cannulation can be provided according to the present invention.

The training method of the present invention can comprise mounting the cannulation pad on the trainee or on a different person or dummy for the purpose of training a trainee. For example, the cannulation pad can be mounted on an armband worn by the trainee himself or herself. Alternatively, the trainee, helper, or dummy can have an arm placed inside the arm cradle and the cannulation pad can be mounted on the arm cradle. The cannulation pad can be a cannulation pad as described herein and can comprise a cannulation electrical circuit conductor, an infiltration electrical circuit conductor, and an insulating layer electrically insulating the cannulation electrical circuit conductor from the infiltration electrical circuit conductor. The method can involve electrically connecting a simulated access to the cannulation electrical circuit conductor. The method can involve electrically connecting a power source to both the cannulation electrical circuit conductor and to the infiltration electrical circuit conductor. The method can involve electrically connecting the power source to a simulated cannula. The simulated cannula can be a simulated cannula as described herein and can have a length, a cannulation needle at a first end, a cannula connector at a second, opposite end, and an electrical conductor extending along the length and electrically connecting the cannulation needle with the cannula connector. The cannula connector can be electrically connected to the power source. The method can comprise having the trainee insert the cannulation needle into a simulated access to train for inserting a real cannulation needle into a real access. The simulated access can be a simulated access as described herein and can comprise an outer sheath and an electrically conductive material retained inside the sheath. By practicing artificial cannulation using the training system, a trainee can become proficient at self-cannulation and be better prepared to perform true cannulation into an access or fistula when the time comes.

Methods of manufacturing the modular training system described herein are also provided and can include preparing an electrically conductive gel for filling the electrically conductive simulated access. Preparing the electrically conductive gel can comprise mixing together borax, glue, salt, and water. Preparing the cannulation pad can involve assembling together the various pad layers and components shown and described herein.

BRIEF DESCRIPTION OF THE DRAWINGS

The invention may be more fully understood with reference to the accompanying drawings. The drawings are intended to illustrate, not limit, the present teachings.

DETAILED DESCRIPTION OF THE INVENTION

Figure 1:
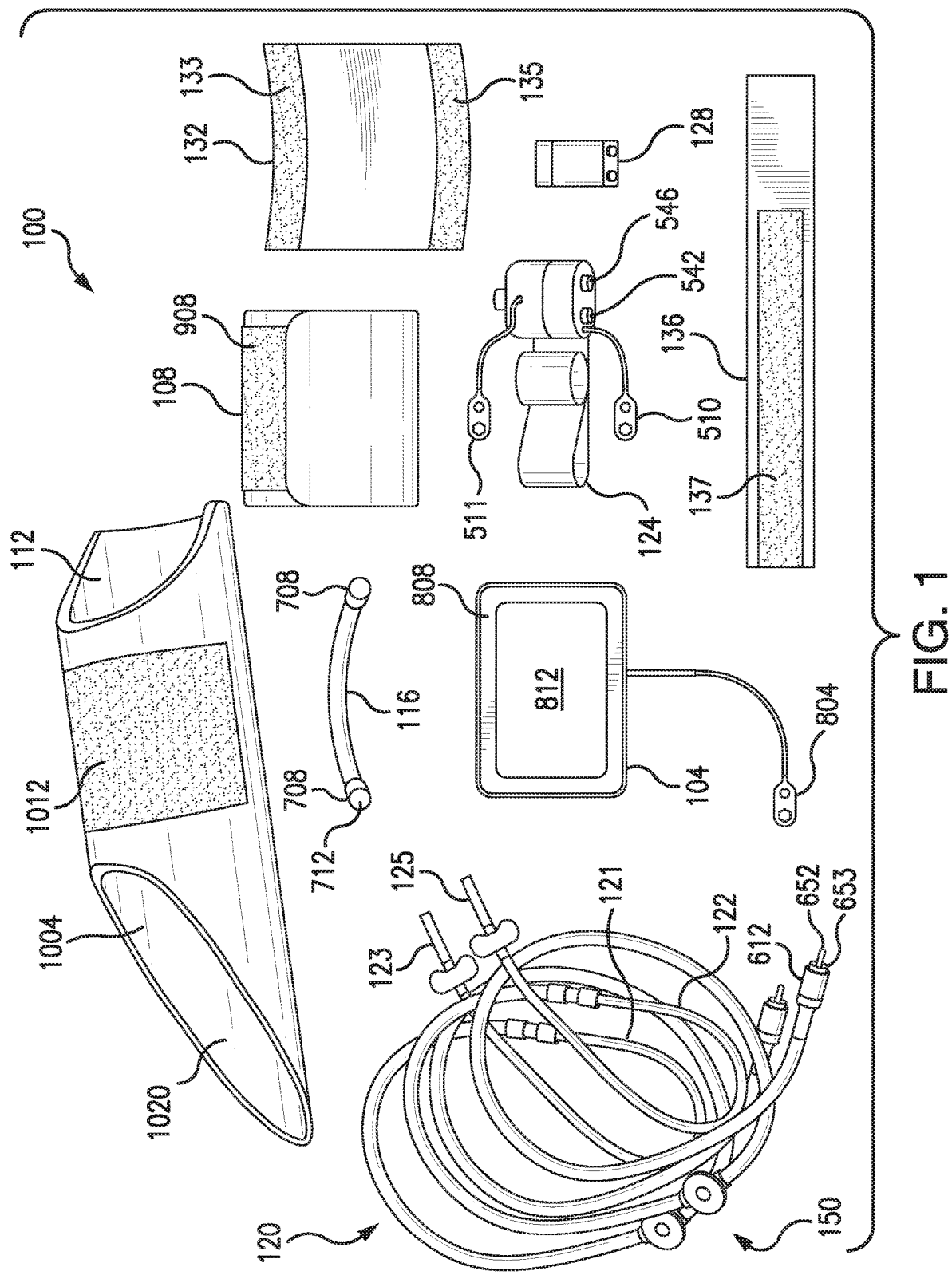
FIG. 1 is a schematic top view of a modular self-cannulation training system according to an embodiment of the present invention.

The present invention provides a self-cannulation training system to enable patients, such as hemodialysis patients, to learn how to self-cannulate. The system comprises a cannulation pad, a simulated access, a simulated cannula, and a control unit. The cannulation comprises a cannulation electrical circuit conductor, an infiltration electrical circuit conductor, and an insulating layer electrically insulating the cannulation electrical circuit conductor from the infiltration electrical circuit conductor. The simulated access is configured to be electrically connected to the cannulation electrical circuit conductor. The simulated access comprises an outer sheath and an electrically conductive material retained inside the sheath. The electrically conductive material can be, for example, an electrically conductive gel. The simulated cannula has a length, a cannulation needle at a first end thereof, and a cannula connector at a second, opposite end thereof. An electrical conductor is provided extending along the length of the simulated cannula and electrically connects the cannulation needle with the cannula connector. The electrical conductor of the simulated cannula can be shielded. The electrical conductor can comprise, for example, a co-axial cable and the cannula connector can comprise an RCA cable connector. The control unit can comprise electrical circuitry, cable connectors, a power source, or a combination thereof. The cable connectors of the control unit can be shielded, co-axial, a combination thereof, or the like. The cable connectors of the control unit can be RCA cable connectors or the like.

The control unit can include a first electrical connector for connecting the power source to the cannulation electrical circuit conductor. The control unit can include a second electrical connector for connecting the power source to the infiltration electrical circuit conductor. The first and second connectors can be the same or different connectors. Another connector can be provided for connecting the control unit, the power source, or both, to the cannula connector.

To provide a patient with feedback during training, a first indicator can be provided in electrical contact with the electrical conductor. The first indicator can be configured to be activated when the cannula needle properly electrically contacts the conductive material retained inside the simulated access when the simulated access is in electrical connection with the cannulation electrical circuit conductor. As such, the system can be configured such that the cannula needle completes and forms a cannulation electrical circuit. The first indicator can be, for example, a light, a flashing light, a red light, an LED, a vibrator, a sound generator, a combination thereof, or the like.

A second indicator, different than the first indicator, can also be provided in electrical contact with the electrical conductor. The second indicator can be configured to be activated when the cannula needle misses or passes through the simulated access and electrically contacts the infiltration electrical circuit conductor. The system can be configured such that, in such an event, the cannula needle completes and forms an infiltration electrical circuit. The second indicator can be, for example, a light, a flashing light, a red light, an LED, a vibrator, a sound generator, a combination thereof, or the like. As an example, the first indicator can comprise a light indicator and the second indicator can comprise a vibrator, a sound alarm, or a combination thereof. The first indicator can comprise a red-light-emitting diode.

The self-cannulation training system can further comprise a second simulated cannula. The second simulated cannula has a length and can comprise a second cannulation needle at a first end thereof, a second cannula connector at a second, opposite end thereof, and a second electrical conductor extending along the length. The second electrical conductor can electrically connect the second cannulation needle with the second cannula connector. The second electrical conductor of the second simulated cannula can be shielded and can comprise a co-axial cable and the second cannula connector can comprise an RCA cable connector.

The simulated access can be electrically connected to the cannulation electrical circuit conductor or can be configured to be electrically connected to the cannulation electrical circuit conductor, for example, electrically connected using magnets. According to various embodiments, a first electrical connector can connect the power source to both the cannulation electrical circuit conductor and to the infiltration electrical circuit conductor, and a second electrical connector can connect the power source to the cannula connector.

To connect the cannulation pad to a patient, for example, to a forearm of a patient, armband can be used and can be provided as part of the system. The armband and the cannulation pad can be configured to be fastened together. A simulated skin covering can also be provided and the armband and the simulated skin covering can be configured to be fastened together, for example, with the simulated access being positioned in between. The simulated access can be positioned to be made in electrical contact with the cannulation electrical circuit conductor before the simulated access is covered by the simulated skin covering.

The simulated skin covering can exhibit a correct resistance to puncturing by the simulated cannula needle, a material that enables a trainee or user to discern the position of a simulated access underneath the simulated skin covering, a correct skin-like stretching and movement, combinations thereof, and the like. The simulated skin covering can comprise a material that enables a trainee or user to see a bulge, highlights, and shadows caused by an underlying simulated access so that the trainee or user can visibly identify where the simulated access is located underneath the simulated skin covering. The simulated skin covering has an outer surface and the outer surface can have a skin tone color, for example, tan, beige, brown black, peach, or the like. The skin tone color of the simulated skin covering can be selected to match the skin color of the patient. The outer surface can be made of a material similar to artificial human skin, for example, a material that is able to give and stretch consonant with the other components and layers. The outer surface can serve the cosmetic purpose of looking like real human skin. A skin tone color can be selected to different patient populations. Moles, freckles, tattoos, scars, combinations thereof, and the like can be added to the outside surface to replicate a particular skin and individual.

The training system can also comprise a wrist band. The wrist band and the control unit can be configured to be fastened together. The wrist band can comprise a fastener, for example, a fastener patch including at least one of hook fasteners and loop fasteners. The control unit can comprise a fastener, for example, a fastener patch including at least one of hook fasteners and loop fasteners. The fastener of the wrist band and the fastener of the control unit can be complementary to each other. The wrist band can comprise a pocket, a strap, or the like, for accommodating the power source, such as a battery pocket for accommodating a battery.

Instead of or in addition to an arm band, the self-cannulation training system can further comprise an arm cradle. The arm cradle can be, for example, tubular in shape and can have a through-hole for accommodating an arm. The arm cradle and the cannulation pad can be configured to be fastened together. The arm cradle can comprise a fastener, for example, a fastener patch including at least one of hook fasteners and loop fasteners. The cannulation pad can comprise a fastener, for example, a fastener patch including at least one of hook fasteners and loop fasteners. The arm cradle and the control unit can be configured to be fastened together. The arm cradle can comprise a second fastener patch including at least one of hook fasteners and loop fasteners, and the control unit can comprise a fastener patch including at least one of hook fasteners and loop fasteners. The arm cradle can comprise a plastic material, such as polyvinylchloride (PVC). The arm cradle can be wrapped with a fabric, rubber, textile, or elastomeric material, for example, wrapped with a NEOPRENE® material, NEOPRENE® being a registered trademark of DuPont Company, Wilmington, Del.

For the hook and loop fasteners described herein, VELCRO® (available from Velcro BVBA, Deinze, Belgium) can be used. Each of the simulated skin covering, wrist band, armband, cradle cover, cannulation pad, and simulated access can independently comprise any suitable material. Exemplary materials that can be used include cotton, linen, spandex, polyester, rayon, nylon, ragadon, elastone, modal, silk, satin, leather, LYCRA® (E. I. DU PONT DE NEMOURS AND COMPANY, Wilmington, Del.), bamboo, hemp, dry-fit materials, wicking materials, breathable materials, blends of such materials, and the like materials. Organic materials can be used. The material can be comfortable. As an example, the material can comprise cotton, polyester, nylon, spandex, LYCRA®, a foamed NEOPRENE® material, a textile material, a blend of materials, a cotton-polyester blend material, a nylon-spandex blend material, or the like. As a further example, the material can comprise at least one of a nylon-spandex blend material and a foamed NEOPRENE® material. The material can comprise a stretchable material.

The electrically conductive material of the simulated access can comprise an electrically conductive material, for example, a liquid, gel, polymer, suspension, emulsion, dispersion, or the like. The electrically conductive material can be a gel, for example, a an electrically conductive gel comprising the reaction product of borax, glue, salt, and water. Sodium chloride or other salts can be used. The outer sheath of the simulated access can comprise a self-sealing material. GORE-TEX® (W. L. Gore & Associates, Inc., Newark, Del.) can be used. Septa material as are used in self-sealing, resealing caps for vials of liquids, can be used.

The present invention also provides a method of training a patient for self-cannulation. The method involves mounting a cannulation pad on the patient. The patient can mount the cannulation pad or someone else. The cannulation pad can be a pad as described herein, for example, including a cannulation electrical circuit conductor, an infiltration electrical circuit conductor, and an insulating layer electrically insulating the cannulation electrical circuit conductor from the infiltration electrical circuit conductor. The method can further involve electrically connecting a simulated access to the cannulation electrical circuit conductor. The simulated access can be, for example, as described herein. The simulated access can comprise an outer sheath and an electrically conductive material retained inside the sheath. The method can involve, but is not limited to, electrically connecting a power source to both the cannulation electrical circuit conductor and to the infiltration electrical circuit conductor. The method can involve, but is not limited to, electrically connecting the power source to a simulated cannula, for example, a simulated cannula as described herein. The simulated cannula has a length and can comprise a cannulation needle at a first end thereof, a cannula connector at a second, opposite end thereof, and an electrical conductor extending along the length. The electrical conductor can electrically connect the cannulation needle with the cannula connector. The cannula connector can already be electrically connected to the power source or the method can involve connecting the cannula connector to the power source. The method can involve of be limited to having the patient insert the cannulation needle into the simulated access to train the patient for inserting a real cannulation needle into a real access of the patient, e.g., to carry out a self-cannulation. The method can also help train others how to carry out a cannulation of the patient.

According to the method, the patient can receive feedback about the self-cannulation carried out. For example, when the patient inserts the cannulation needle into the simulated access such that a distal tip of the cannulation needle rests inside the access, a first indicator is activated to indicate that a proper cannulation into the simulated access has been achieved. For example, if the insertion results in a positioning of the needle that enables an unrestricted fluid communication between the interior of the simulated access and an opening at the distal tip of the needle, the first indicator is activated.

The method can involve providing feedback in the form of signaling a fault, error, or alarm, when the cannulation does not result in a proper positioning of the tip of the needle. For example, when the patient inserts the cannulation needle into the cannulation pad such that the distal tip of the cannulation needle contacts the infiltration electrical circuit conductor, a second indicator can be activated to indicate that an improper cannulation into the simulated access has resulted. The first indicator can comprise a red light, for example, a red-light emitting LED. The second indicator can comprise, for example, a vibrator or sound-generator.

The method can involve mounting the cannulation pad on the patient. The mounting can comprise fastening an arm band to a forearm of the patient. The method can involve fastening the cannulation pad to the arm band. Mounting the cannulation pad on the patient can comprise placing a forearm of the patient into an arm cradle. The method can involve fastening the cannulation pad to the arm cradle. The method can involve fastening a simulated skin covering over the simulated access before inserting the cannulation needle into the simulated access. The method can involve selecting a skin tone color that matches the skin tone of the patient.

With reference now to the drawings, FIG. 1 is a schematic top view of a modular self-cannulation training system 100 according to an embodiment of the present invention. Modular self-cannulation training system 100 comprises a cannulation pad 104, an armband 108, an arm cradle 112, a simulated access 116, a set 120 of simulated cannulas 121, 122, a control unit 124, a battery 128, a simulated skin covering 132, and a wrist band 136. As can be seen from the top view shown, cannulation pad 104 includes a cannulation electrical circuit conductor 808 in the form of a frame, and an insulator layer 812 separating cannulation electrical circuit conductor 808 from underlying components. More details of cannulation pad 104 are shown in, and described in connection with, FIG. 8. A two-terminal electrical connector 804 can be used to electrically connect cannulation pad 104 to a two-terminal electrical connector 510 of control unit 124. A second two-terminal electrical connector 511 is provided to connect control unit 124 to battery 128. More details of control unit 124 are shown in, and described in connection with, FIG. 5 and FIG. 11.

Simulated access 116 includes a stack of magnets 712 at each end thereof and left and right magnet housings 708 for respectively housing stacks of magnets 712. More details of simulated access 116 are shown in, and described in connection with, FIGS. 7A and 7B. Simulated cannulas 121 and 122 can comprise a simulated arterial cannula and a simulated venous cannula. Cannula needles at the tips of simulated cannulas 121 and 122, are protected by needle sheaths 123 and 125, respectively. Each of simulated cannulas 121 and 122 terminates at an RCA jack, for example, male RCA connector 612 having a connector post 652 and a cup-shaped metal conductor 653. Suction cups 150 are provided for attaching simulated cannulas 121 and 122 to a trainee's skin or to another surface and can be color-coded, for example, red for the simulated arterial cannula and blue for the simulated venous cannula. More details of simulated cannula 121 are shown in, and described in connection with, FIGS. 6 and 11.

Armband 108 can comprise a sleeve configuration through which a trainee's arm can pass. Armband 108 can comprise a longitudinal opening or access so that armband 108 can be pushed onto an arm. One or more hook or loop or other fastener material patches 908 can be provided so that other modular components of the system can be fastened to and retained by armband 108. More details of armband 108 are shown in, and described in connection with, FIGS. 3 and 9.

Arm cradle 112 can comprise a tube 1004 covered on its inside surface with a NEOPRENE® or other elastomeric material 1020 intended to make contact with the skin of a trainee's arm. An outer surface of arm cradle 112 can also be coated or wrapped with a NEOPRENE® or other elastomeric material. Outer surface 1008 can include a wide patch 1012 of hook fasteners configured to fasten and retain a cannulation pad such as cannulation pad 104 shown in FIG. 1. More details of arm cradle 112 are shown in, and described in connection with, FIGS. 4 and 10.

Simulated skin covering 132 can be used to cover simulated access 116 and attach to armband 108 or arm cradle 112 so as to mimic an access or fistula of the trainee, under the surface of trainee's skin. Simulated skin covering 132 can comprise first and second fastener patches 133 and 135 that can be, for example, in the form of loop fastener patches adapted to fasten simulated skin covering 132 to armband 108 or arm cradle 112 and retain simulated skin covering thereon.

Wrist band 136 is provided with a fastener patch 136 that can be, for example, in the form of a loop fastener patch or a hook fastener patch adapted to fasten wrist band 136 around the wrist of a trainee or other user and configured to fasten and retain a control unit, battery, or both, to wrist band 136. Wrist band 136 can be used together with armband 108, in some embodiments.

Figure 2:
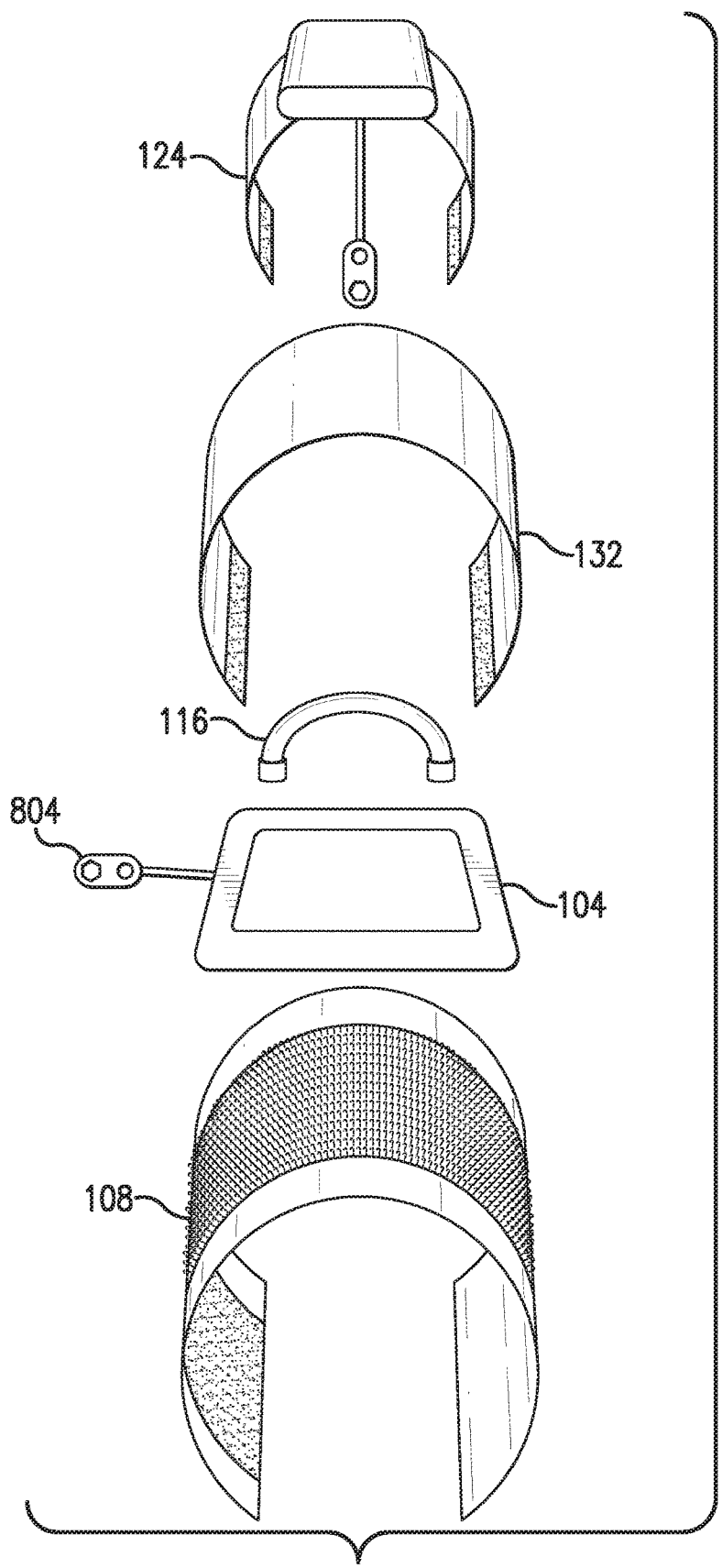
FIG. 2 is an exploded end view of a modular system according to an embodiment of the present invention and including the armband shown in FIG. 1.

FIG. 2 is an exploded end view of a modular system according to an embodiment of the present invention and including armband 108 shown in FIG. 1, positioned to fasten and retain cannulation pad 104 shown in FIG. 1, onto which simulated access 116 can be magnetically retained, and onto which simulated skin covering 132 can be retained covering simulated access 116. Control unit 124 can be fastened to armband 108 or wrist band 136 can be used in conjunction with armband 108, to retain control unit 124.

Figure 3:
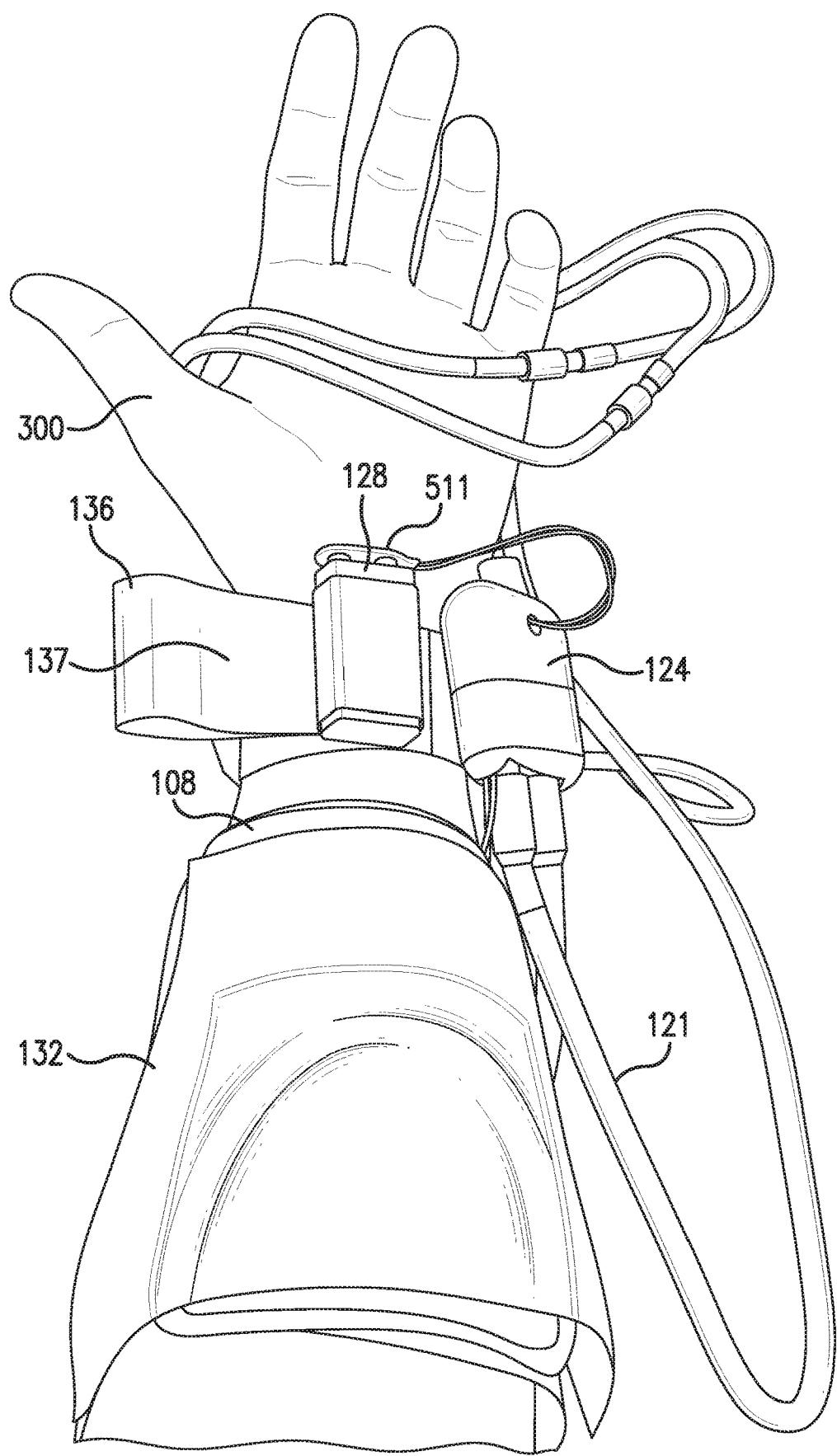
FIG. 3 is a top view of the modular system shown in FIG. 2, assembled, on an arm of a trainee, and further including a power source and two simulated cannulas connected to the control unit.

FIG. 3 is a top view of the modular system shown in FIG. 2, assembled, on an arm of a trainee, and further including a power source in the form of battery 128, connected to two-terminal connector 511, and wherein control unit 124 is also connected to two simulated cannulas including cannula 121. As can be seen in FIG. 3, control unit 124 is fastened to wrist band 136, on fastener strip 137, and simulated skin covering 132 covers simulated access 116 so it appears as, or mimics, a bulging fistula on the arm of a trainee 300.

Figure 4:
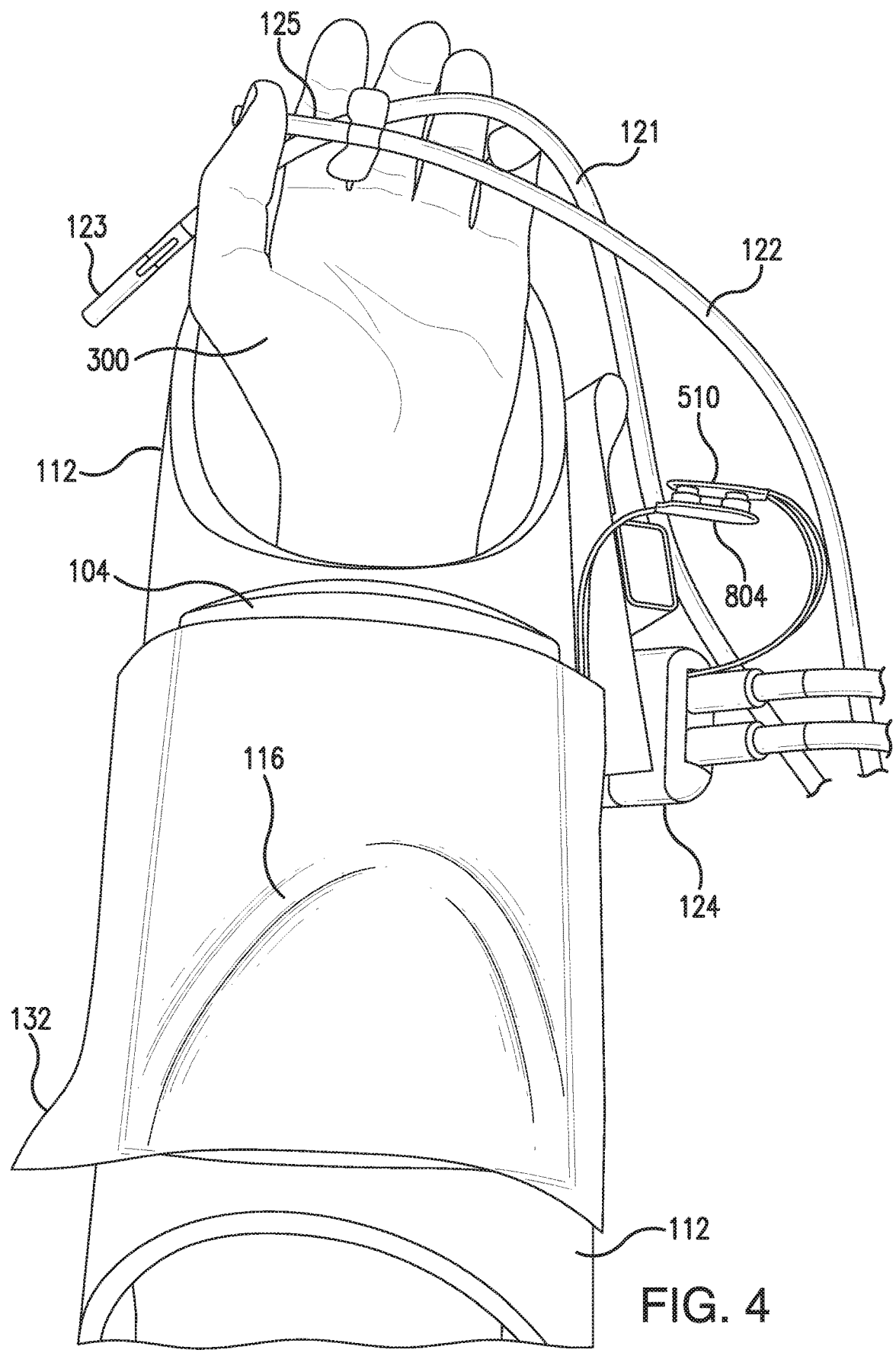
FIG. 4 is a top view of a modular system according to an embodiment of the present invention, assembled, on an arm of a trainee, and including the arm cradle shown in FIG. 1.

FIG. 4 is a top view of a modular system according to an embodiment of the present invention, assembled, on an arm of a trainee, and including arm cradle 112 shown in FIG. 1. In the embodiment shown in FIG. 4, arm cradle 112 is used. The arm of a trainee 300 is cradled in arm cradle 112. Cannulation pad 104 is fastened to a hook fastener patch on arm cradle 112 by a hook and loop fastener engagement. The bottom of cannulation pad 104 is fastened to arm cradle 112 via engagement of complementary hook and loop fasteners. other complementary fasteners and engagement devices can be used. Simulated access 116 can be magnetically secured to a cannulation electrical circuit conductor of cannulation pad 104. Simulated access 116 is covered by simulated skin covering 132 that is attached to arm cradle 112 via a hook and loop fastener engagement. At the training step shown in FIG. 4, trainee 300 is holding simulated cannulas 121 and 122 protective sheaths 123 and 125 remain covering and protecting the cannula needle tips of simulated cannulas 121 and 122, respectively. FIG. 4 also shows control unit 124 fastened to arm cradle 112 and retaining battery 128. As can be seen, control unit 124 is connected to cannulation pad 104 through the connection between connectors 510 and 804.

Figure 5:
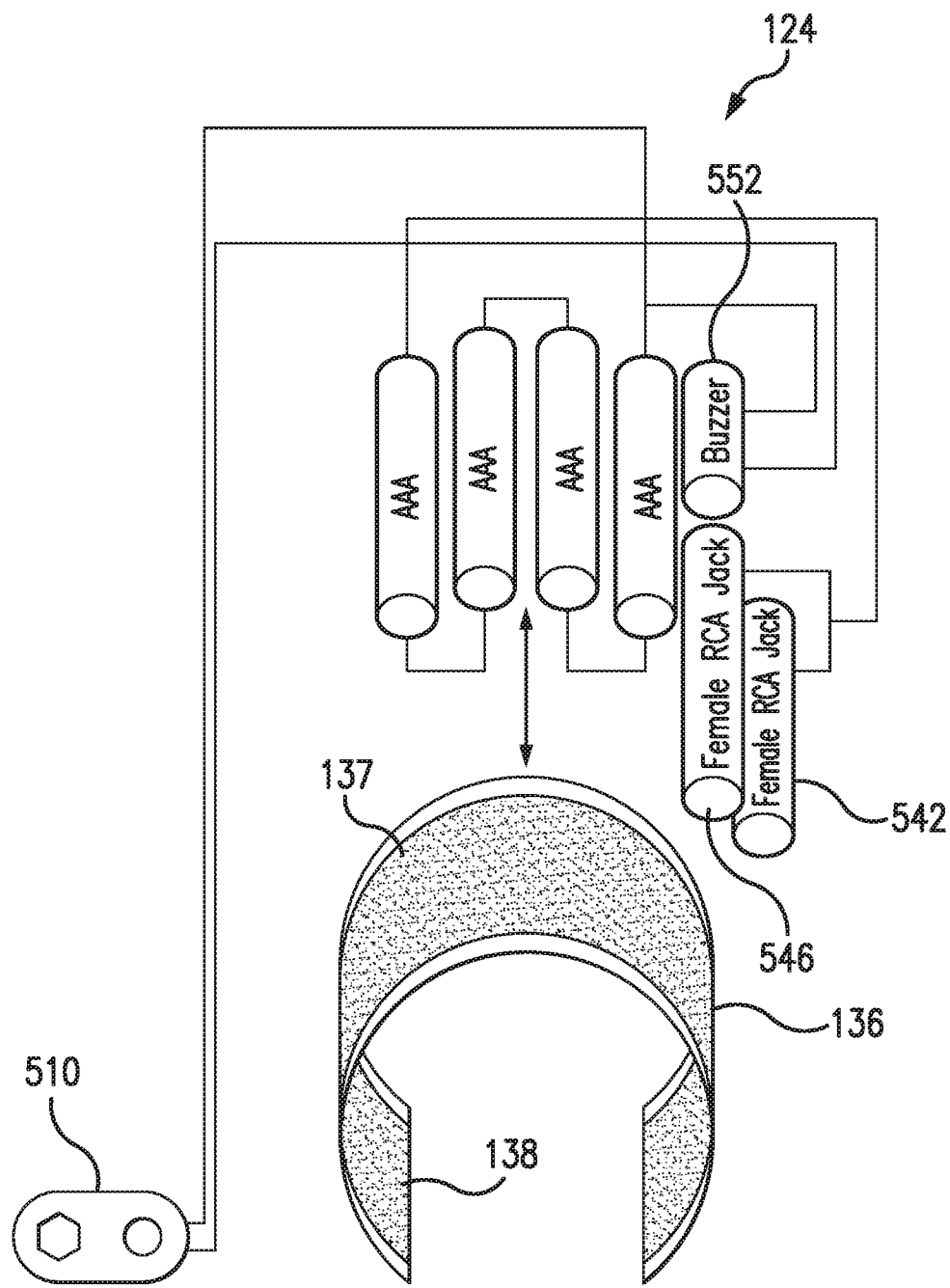
FIG. 5 is a schematic view showing exemplary components of the control unit shown in FIG. 1, together with the wrist band shown in FIG. 1.

FIG. 5 is a schematic view showing exemplary components of control unit 124 shown in FIG. 1, together with wrist band 136 shown in FIG. 1. In the embodiment shown in FIG. 5, wrist band 136 and hook fastener patch 137 on the outer surface thereof. Inner surface 138 of wrist band 136 can have a loop fastener patch 138 or surface that can engage hook fastener patch 137 to secure wrist band 136 to a trainee's arm or wrist. In FIG. 5, control unit 124 is shown to include four triple a (AAA) batteries as a power source as opposed to the 9-volt battery source shown in FIGS. 1, 3, and 4. FIG. 5 also shows buzzer 552 and female RCA connectors 542 and 546 as part of the electric circuit terminating at two-terminal connector 510.

Figure 6:
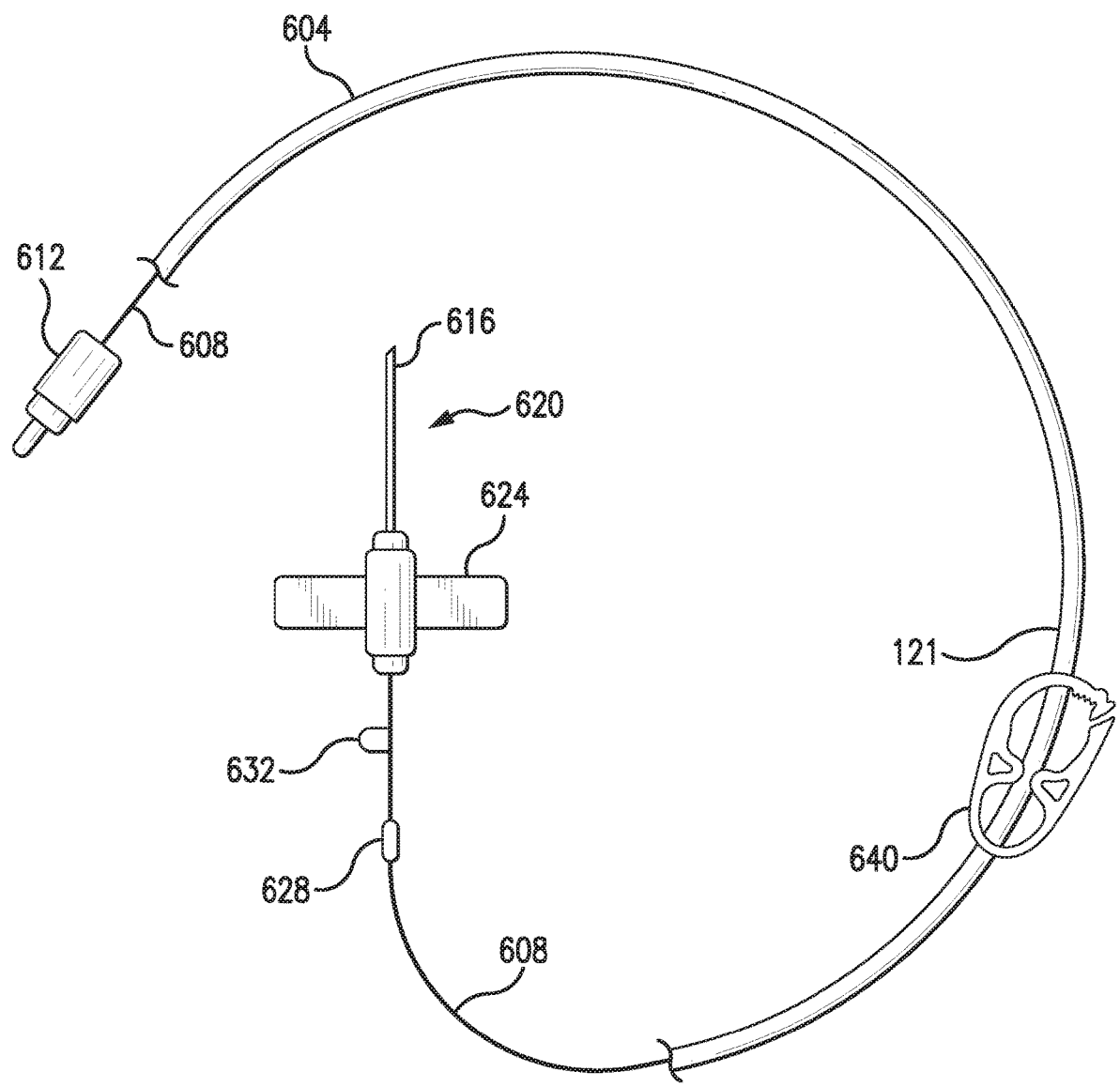
FIG. 6 is a top view of one of the simulated cannulas shown in FIG. 1, with end portions of the sheath peeled away to show the conductive wire running the length of the simulated cannula.

FIG. 6 is a top view of simulated cannula 121 shown in FIG. 1, with end portions of cannula sheath 604 peeled away to show conductive wire 608 running the length of simulated cannula 121. Male RCA connector 612 is provided at one end thereof, and needle 616 is provided at needle end 620 of simulated cannula 121. An LED 632 is provided teamed with a matched resistor 628. Wing 624 is provided with an adhesive backing such that, once the tip of needle 616 is properly cannulated into simulated access 116, it can be secured to the arm of a trainee, to the armband, or to the arm cradle, depending on the particular modular components with which cannula 121 is used.

Figure 7A:
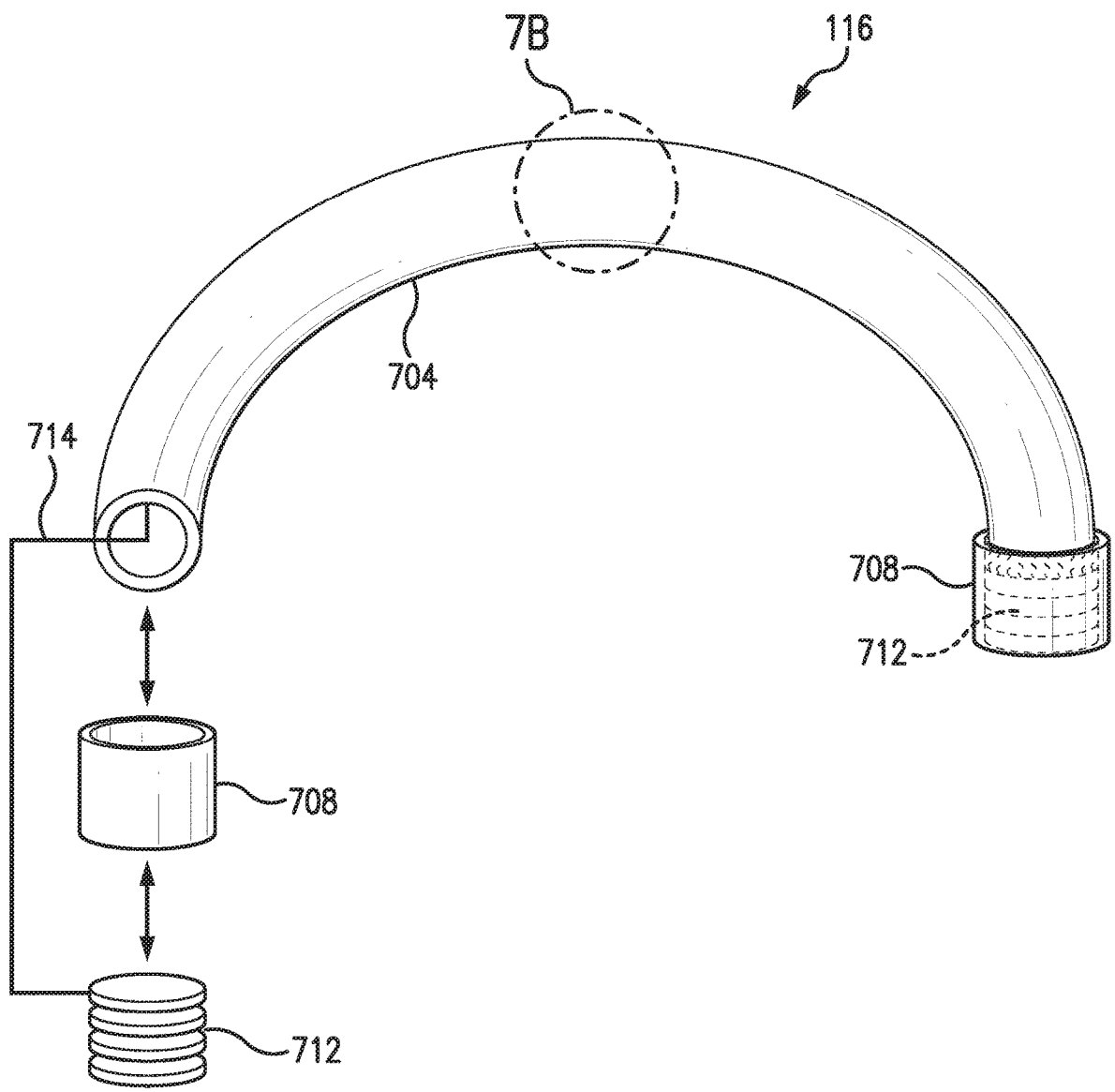
FIG. 7A is an exploded side view of the simulated access shown in FIG. 1 and showing a stack of magnets, a magnet holder, and a conductive wire electrically connecting the stack of magnets to the interior of the simulated access.
Figure 11:
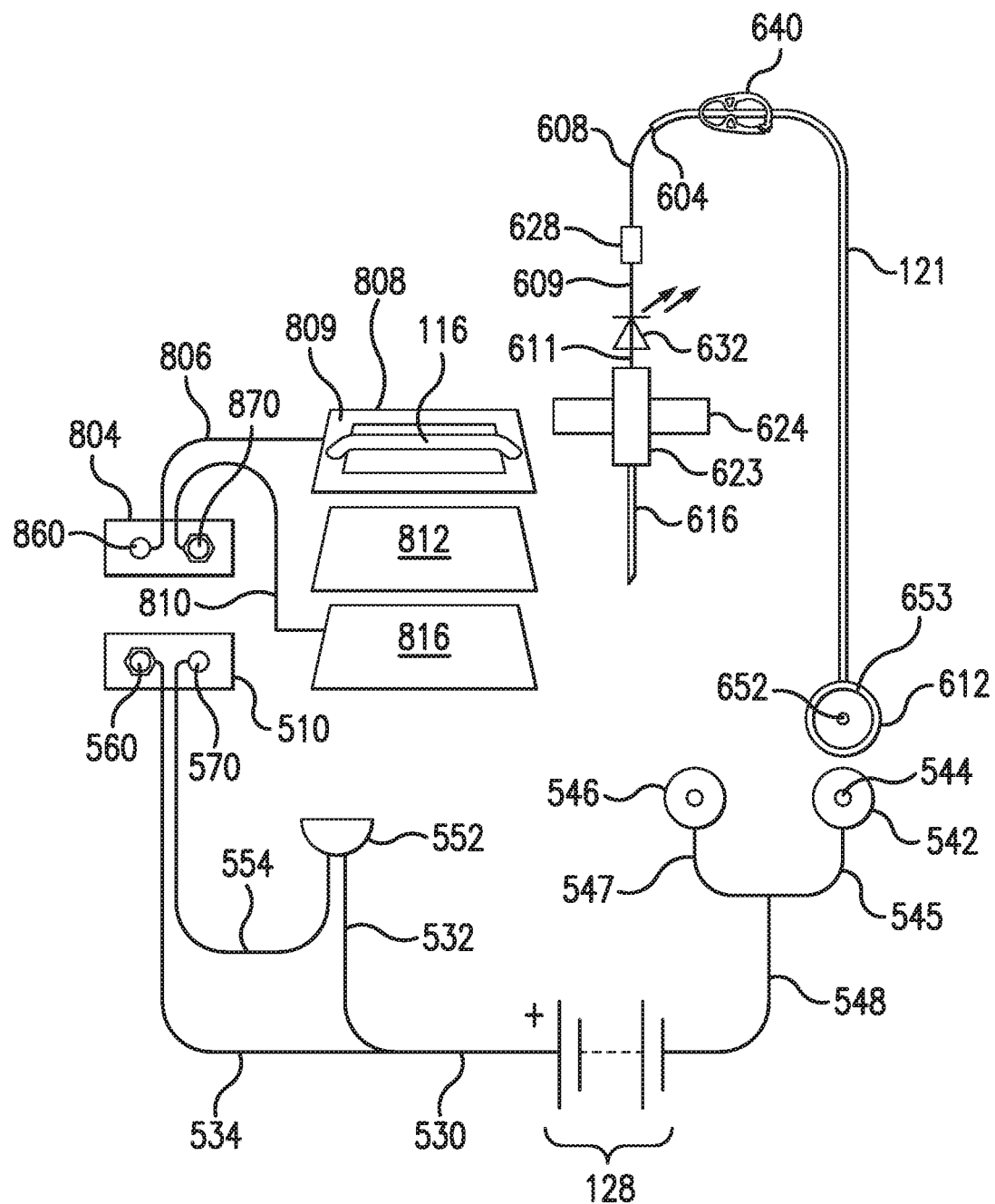
FIG. 11 is a schematic view of an electrical system including modular electrical components and circuitry according to various embodiments of the present invention.

FIG. 7A is an exploded side view of simulated access 116 shown in FIG. 1. Simulated access 116 includes a flexible access tube 704 that punctures like human vasculature and is filled with an electrically conductive slime 730. Simulated access also includes a stack of magnets 712, left and right magnet housings 708, and a conductive wire 714 electrically connecting stack of magnets 712 to conductive slime 730 in the interior of simulated access flexible access tube 704. Stack of magnets 712 can comprise any number of disk-shaped magnets although four are shown. Each magnet of stack of magnets 712 can comprise a permanent magnetic material. Ferromagnetic and ferrimagnetic materials can be used. Ferrimagnetic materials that include ferrites, magnetite, and lodestone can be used. Magnets comprising the elements iron, nickel, cobalt, alloys thereof, and alloys of rare-earth metals, can be used. Magnets comprising rare earth (lanthanoid) elements can be used, for example, magnets comprising samarium-cobalt or neodymium-iron-boron (NIB) materials. Composite magnet materials can be used, for example, ceramic or ferrite magnets made of a sintered composite of powdered iron oxide and barium/strontium carbonate ceramic, or the like, can be used. The magnets can be configured to magnetically hold tightly to cannulation electrical circuit conductor 808 as shown in FIG. 11, and cannulation electrical circuit conductor 808 can comprise a magnetically attractable material such as a ferromagnetic material or stainless steel.

Figure 7B:
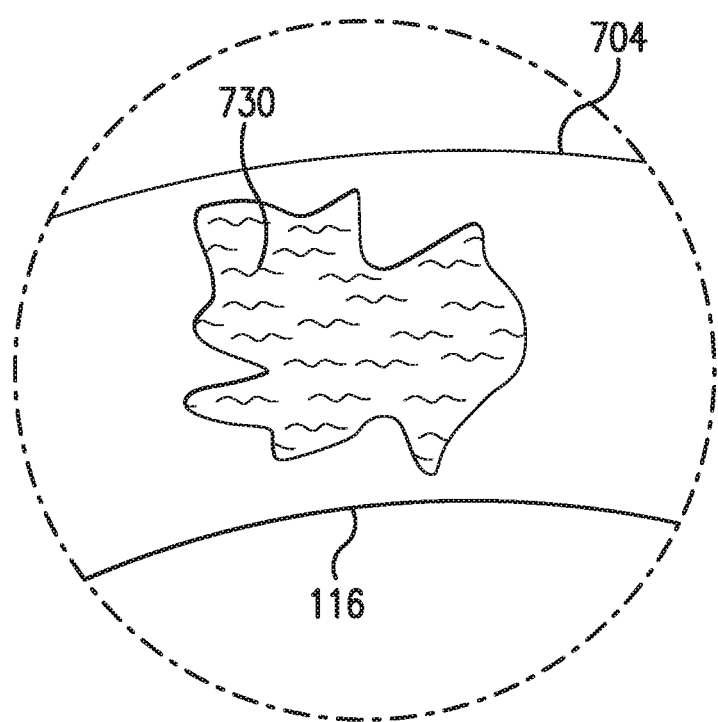
FIG. 7B is an enlarged view of section 7B shown in FIG. 7A, and broken-away to show the conductive gel inside the simulated access.

FIG. 7B is an enlarged view of section 7B shown in FIG. 7A, and broken-away to show conductive slime or gel 730 in the interior of flexible access tube 704 of simulated access 116. Conductive slime or gel 730 can be part of an electrical circuit pathway that includes wire 714, stack of magnets 712, and cannulation electrical circuit conductor 808. Flexible access tube 704 can comprise a self-sealing or re-sealable material, for example, a GORE-TEX® material, an elastomeric material, a rubber material, a septum material, a hydrophobic material, a combination thereof, or the like. GORE-TEX® is a registered trademark of W. L. Gore and Associates.

Figure 8:
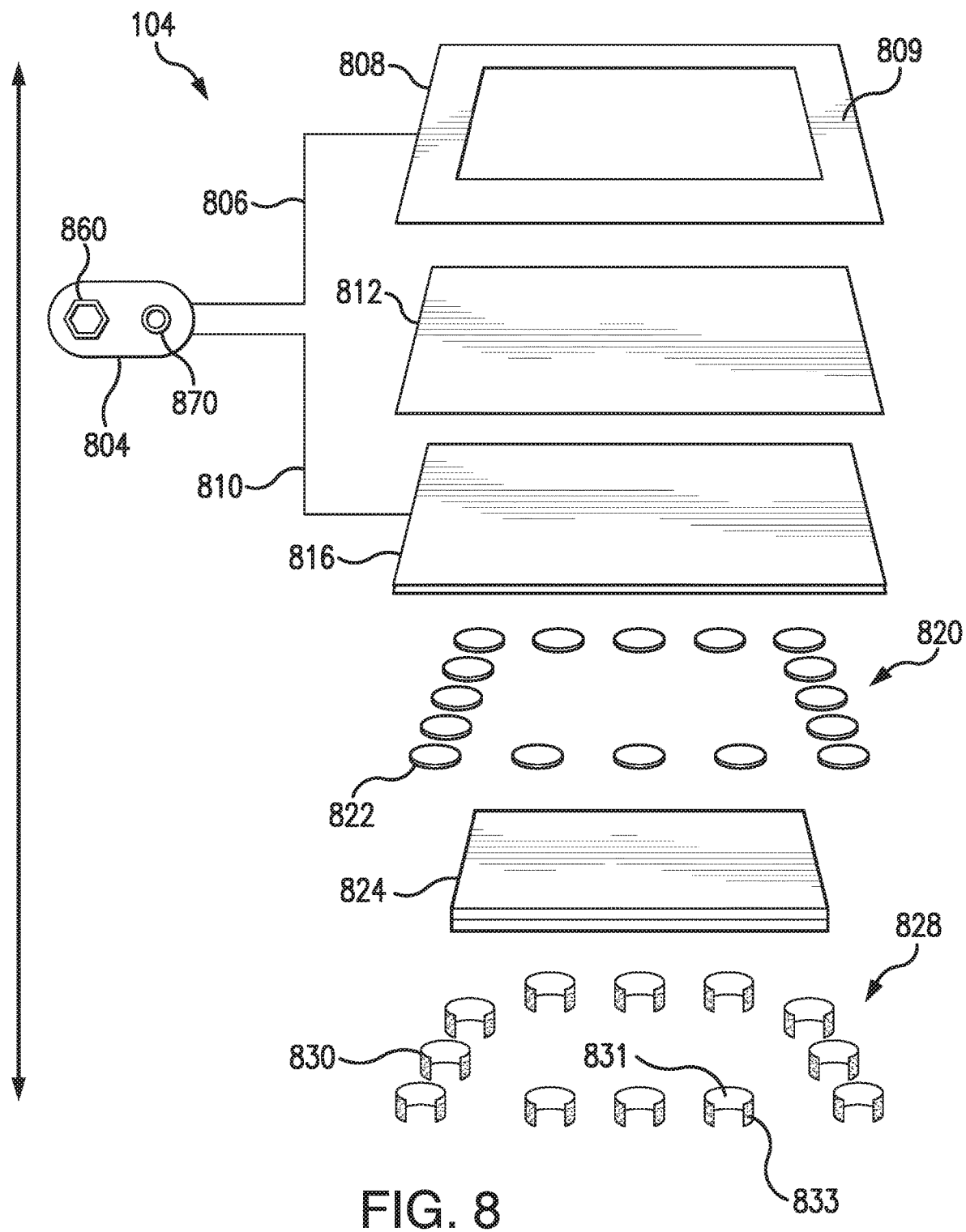
FIG. 8 is an exploded view of the cannulation pad shown in FIG. 1, including a cannulation electrical circuit conductor and an infiltration circuit conductor separated by an insulator, and an array of magnets for magnetically attracting and holding the simulated access shown in FIGS. 1, 7A, and 7B.

FIG. 8 is an exploded view of cannulation pad 104 shown in FIG. 1, including a cannulation electrical circuit conductor 808, an infiltration electrical circuit conductor 816, and an insulator 812 separating cannulation electrical circuit conductor 808 and infiltration electrical circuit conductor 816. An array 820 of individual magnets 822 is provided for magnetically attracting and holding simulated access 116 shown in FIGS. 1, 7A, and 7B. A two-terminal electrical connector 804 is connected to cannulation pad 104 and can comprise, for example, a snap connector, T-type connector, or clip connector, as are used for connecting to 9-volt batteries. Two-terminal electrical connector 804 has connection posts 860 and 870 that are complementary to each other and complementary to connection posts 560 and 570, respectively, of two-terminal connector 510 shown in FIGS. 1, 4, 5, and 11. Connection posts 860 and 870 can include one post connector and one buckle connector configured to fit onto the post connector. The two connection posts of connector 804 are not, however, for respectively connecting to a positive and negative terminal of a battery or circuit, but rather, both are connected through electrical leads and through two-terminal connector 510, to the positive terminal of battery 128 once battery 128 is connected to battery connector 511.

Post connector 860 is electrically connected to cannulation electrical circuit conductor 808 through electrical lead 806 as also shown in and also described above in connection with FIG. 8. Buckle connector 870 is electrically connected to infiltration electrical circuit conductor 816 through electrical lead 810 as also shown in and also described in connection with FIG. 11. As such, and given the arrangement shown in FIG. 11, two-terminal electrical connector 804 is designed for connection to two-terminal electrical connector 510. Cannulation electrical circuit conductor 808 can comprise stainless steel or other metallic sheeting. Infiltration electrical circuit conductor 816 can comprise a double-layer of aluminum foil. Insulator 812 can comprise NEOPRENE®.

Figure 9:
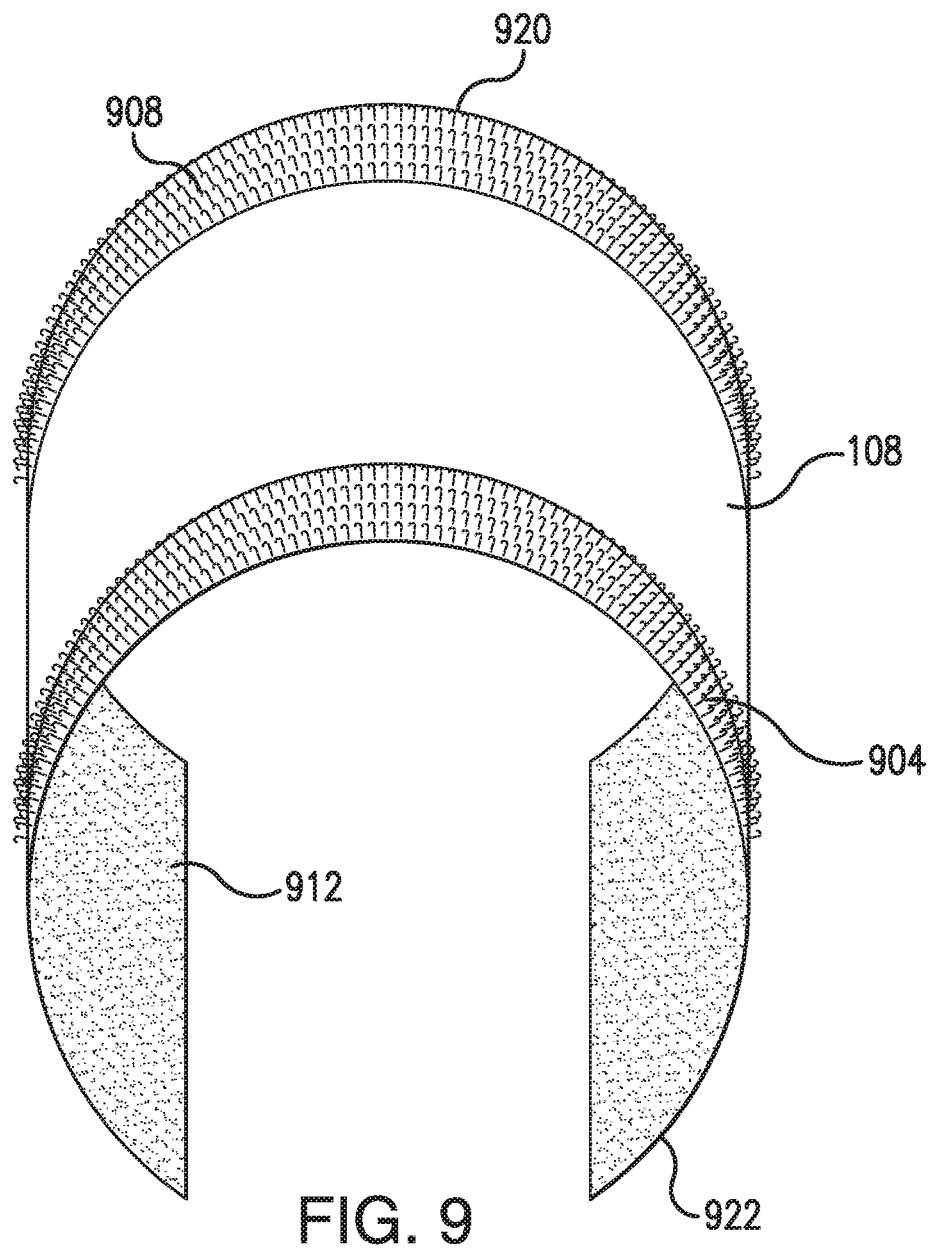
FIG. 9 is a top, end perspective view of the armband shown in FIG. 1.

Also shown in FIG. 8 are an array 828 of individual loop patches 830, such as VELCRO® loop patches, to attach cannulation pad 104 to armband 108 (shown in FIGS. 1, 2, 3, and 9) at hook bands 904 and/or 908 on the outer surface of armband 108 as shown in FIG. 9. Each VELCRO® patch 830 has an adhesive side 831 comprising, for example, a pressure sensitive adhesive, and a a loop fastener side 833 enabling each VELCRO® patch to removably attach to hook fasteners on armband 108 or arm cradle 112. In addition, a triple-layer of puncture resistant fabric 824 is provided adjacent to the bottom surface of cannulation pad 104, between array 820 and array 828, to prevent a simulated cannula from piercing the skin of a trainee in the event that a simulated cannula goes infiltrates cannulation pad 104, for example, if the distal tip of a simulated cannula pierces through simulated access 116, and penetrates through insulator 812.

Although VELCRO® patches 830 are shown curled, upon assembly of cannulation pad 104 each VELCRO® patch 830 is uncurled and attached to the underside of puncture resistant fabric 824 such that, for each VELCRO® patch 830, adhesive side 831 contacts puncture resistant fabric 824 and loop fastener side 833 is exposed at the bottom of cannulation pad 104. Instead of, or in addition to, an adhesive, each VELCRO® patch can be sewn to cannulation pad 104, heat-bonded to cannulation pad 104, snap-fastened to cannulation pad 104, or otherwise affixed to cannulation pad 104.

To assemble cannulation pad 104, the various layers shown in FIG. 8 are affixed together. The various layers can be glued together, otherwise adhered together, heat-sealed together, plastic-welded together, clamped together, stitched together, riveted together, laminated together, held together by a combination of such techniques, or otherwise manipulated to be brought together to form cannulation pad 104.

FIG. 9 is a top, end perspective view of armband 108 shown in FIG. 1. Armband 108 can comprise a flexible material, a rigid plastic material, a combination thereof, or the like. An elastic fabric material can be used. Armband 108 can be tubular, semi-tubular, open tubular, elastically deformable, inelastically deformable, a combination thereof, or the like. Armband 108 can have a narrow end 920 and a wide end 922 that is wider than narrow end 920. The inside surface 912 of armband 108 can comprise a loop fastener material, such as VELCRO® loop fasteners. One or more patches of loop fastener material can be included on the inside surface 912 of armband 108. On the outside surface of armband 108 one or more strips or patches of hook fasteners can be provided, for example, VELCRO® hook fasteners. In the embodiment shown a narrow strip 908 of hook fasteners is provided at narrow end 920, for example, a one-inch wide strip, and a wider strip 904 of hook fasteners is provided at wide end 922, for example, a four-inch wide strip. Narrow strip 908 of hook fasteners on the outside of armband 108 can be configured to fasten with loop fasteners of a control unit or control unit housing. Wide strip 904 of hook fasteners on the outside of armband 108 can be configured to fasten with an retain loop fasteners of a cannulation pad, for example, cannulation pad 104 shown and described herein. Array 828 of loop fasteners 830, shown in FIG. 8, can fasten to wide strip 904 of hook fasteners to hold cannulation pad 104 in place on armband 108. Armband 108 can be used in conjunction with wrist band 136, shown in FIGS. 1 and 3, that can also have a patch or strip 137 of hook or loop fasteners to fasten control unit 124 and battery 128 as shown in FIG. 3.

Figure 10:
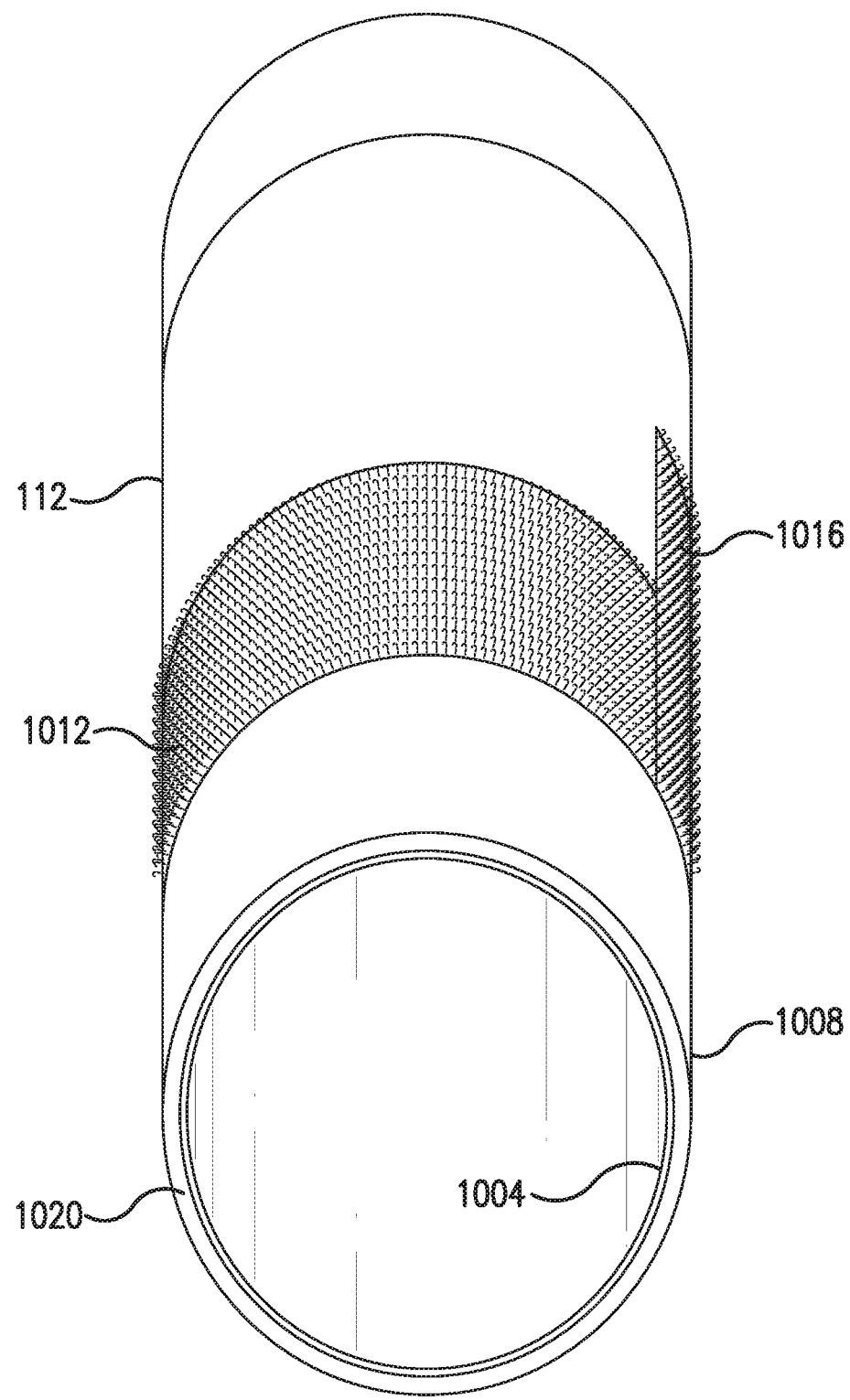
FIG. 10 is a top, end perspective view of the arm cradle shown in FIG. 1.

FIG. 10 is a top, end perspective view of arm cradle 112 shown in FIG. 1. Arm cradle 112 comprises a rigid polyvinylchloride tube 1004 wrapped or covered on its inside surface with a NEOPRENE® material 1020 intended to make contact with the skin of a trainee's arm. An outer surface 1008 of arm cradle 112 can also be coated or wrapped with a NEOPRENE® or other elastomeric material. Outer surface 1008 can include a wide patch 1012 of hook fasteners configured to fasten and retain a cannulation pad such as cannulation pad 104 shown in FIG. 1 and having an array 828 of loop fastener patches 830 as shown in FIG. 8. Outer surface 1008 can include a narrow strip 1016 of hook fasteners configured to fasten loop fasteners on a band of a control unit such as control unit 124 shown in FIG. 1. Arm cradle 112 can have tapered cut-outs at opposite ends, as shown in FIG. 1, or can comprise a non-tapered continuous tubular configuration as shown in FIG. 10.

FIG. 11 is a schematic view of an electrical system including modular electrical components and circuitry according to various embodiments of the present invention. As shown in FIG. 11, simulated cannula 121 comprises an insulative sheath 604 surrounding a conductive wire 608 as also shown and described in connection with FIG. 6. One end of simulated cannula 121 has a male RCA connector 612 including a conductive post 652 in the center thereof. Conductive post 652 is in electrical communication with conductive wire 608. Surrounding conductive post 652 of male RCA connector 612 is an outer, cup-shaped metal conductor 653 that is electrically insulated from conductive post 652. Outer metal conductor 653 is not connected to conductive wire 608 and is simply used as a connection tool to center conductive post 652 and fix male RCA connector 612 to a female RCA connector 542 of control unit 124. Greater details of an exemplary control unit 124 are shown in and described in connection with FIG. 5. Although RCA connections are typically as connectors for co-axial, shielded wires, in the embodiment shown in FIG. 11, the RCA connectors are simply used for a single lead, specifically, only as a connector for conductive wire 608.

Male RCA connector 612 fits onto female RCA connector 542 such that post 652 fits snugly inside recess 544 of female RCA connector 542. Like male RCA connector 612, female RCA connector is used as a single lead, not co-axial, connector, enabling an electrical connection between conductive wire 608, an electrical lead 545, an electrical lead 548, and battery 128. Similarly, a male RCA connector at the end of a second simulated cannula (not shown in FIG. 11) can connect to female RCA connector 546 and also be made in electrical connection with battery 128 through an electrical lead 547 that also contacts, for example, merges into, electrical lead 548.

To show conductive wire 608, FIG. 11 shows a portion of insulative sheath 604 stripped away from conductive wire 608 at an end of simulated cannula 121 opposite the end having male RCA connector 612. As can be seen, conductive wire 608 connects to a resistor 628. Resistor 628 is electrically connected to an LED 632 through an electrical lead 609. LED 632 is in-turn electrically connected to a distal, conductive, simulated cannula needle 616, through an electrical lead 611. Conductive, simulated needle 616 can be solid, hollow, dual lumen, or the like. Conductive, simulated needle 616 can be protected by a needle sheath 123 or 125 as shown in FIGS. 1 and 4, until ready for use. Electrical leads 609 and 611 can be wires, can be of the same gauge or of a different gauge or gauges than electrical wire 608, and can also be protected by an insulative sheath although not shown in FIG. 11. As such, an electrical pathway is formed from post 652 of male RCA connector (jack) 612 all the way to the distal tip of needle 616.

Resistor 628 has a resistance that is matched to LED 632 to prevent burn-out of LED 632 and to provide long-life and consistent operation of LED 632. LED 632 can be a red LED, for example, to mimic the flash of blood that would result from proper cannulation of a real artery with a real cannula at the first moment of fluid connection. Simulated cannula 121 can be colored are partially colored red, for example, with a solid, an opaque, or a semi-transparent red coloring, to simulate an arterial cannula. Simulated cannula 121 can be colored blue, for example, with a solid, an opaque, or semi-transparent blue coloring, to simulate a venous cannula. The modular system can be provided with both a red simulated cannula and a blue simulated cannula. In an example, simulated cannula 121 shown in FIG. 1 can be of a red color or shading whereas simulated cannula 122 shown in FIG. 1 can be of a blue color or shading.

Adjacent to the tip of conductive cannula needle 616, a needle base 623 is provided and can be made, for example, of plastic. Wings 624 can extend from needle base 623 and can have an adhesive underside, for example, including a pressure sensitive adhesive that is protected by a removable liner. Electrical lead 611 can pass through needle base 623 and contact the distal tip of conductive needle 616 such that conductive needle tip is in electrical contact with LED 632.

While one terminal of battery 128 is in electrical contact with electrical lead 548, leading to female RCA connectors 542 and 546, the other terminal of battery 128 is in electrical contact with an electrical lead 530 that branches into a first electrical lead 532 and a second electrical lead 534. First electrical lead 532 is in electrical contact with a buzzer 552 and buzzer 552 is also in electrical contact with a third electrical lead 554. Electrical leads 534 and 554 terminate at connection posts 560 and 570, respectively, of a two-terminal electrical connector 510. Two-terminal electrical connector 510 can be, for example, a snap connector, T-type connector, or clip connector, as are used for connecting to 9-volt batteries. Connection posts 560 and 570 can be complementary to each other, with one being a post and the other being a buckle configured to fit onto the post. The two connection posts of connector 510 are not, however, for respectively connecting to a positive and negative terminal of a battery, but rather, both are connected through electrical leads to the positive terminal of battery 128. The flat, non-bulky nature of such connectors enable such connectors to be well-suited for the modular systems described herein.

Two-terminal electrical connector 510 is configured to connect with a second two-terminal electrical connector 804. Two-terminal electrical connector 804 can also be, for example, a snap connector, T-type connector, or clip connector, as are used for connecting to 9-volt batteries. Two-terminal electrical connector 804 has connection posts 860 and 870 that are complementary to each other and complementary to connection posts 560 and 570, respectively, of two-terminal connector 510. Connection posts 860 and 870 can include one post connector and one buckle connector configured to fit onto the post connector. The two connection posts of connector 804 are not, however, for respectively connecting to a positive and negative terminal of a battery or circuit, but rather, both are connected through electrical leads and through two-terminal connector 510, to the positive terminal of battery 128.

Post connector 860 is electrically connected to cannulation electrical circuit conductor 808 through electrical lead 806 as also shown in and also described above in connection with FIG. 8. Buckle connector 870 is electrically connected to infiltration electrical circuit conductor 816 through electrical lead 810 as also shown in and also described above in connection with FIG. 8. As such, and given the arrangement shown in FIG. 11, when two-terminal electrical connector 804 is connected to two-terminal electrical connector 510, each of cannulation electrical circuit conductor 808 and infiltration electrical circuit conductor 816 are in electrical contact with the positive terminal of battery 128. As described in connection with FIG. 8, cannulation electrical circuit conductor 808 and infiltration electrical circuit conductor 816 are electrically insulated from one another by insulator 812. As can be seen, only the electrical pathway from infiltration electrical circuit conductor 816 to the positive terminal of battery 128 passes through and would activate buzzer 552, whereas the electrical pathway through cannulation electrical circuit conductor 808 to the positive terminal of battery 128 would bypass and thus not activate buzzer 552. Such electrical pathways would need, however, to be completed or closed, for example, by connecting simulated cannula 121 to female RCA connector 542 or 546 and electrically contacting needle 616 with either or both of cannulation electrical circuit conductor 808 or infiltration electrical circuit conductor 816.

According to training methods provided herein, cannulation and self-cannulation can be practiced by cannulating simulated access 116 with needle 616. Layers 808, 812, and 816 can be assembled together with insulator 812 electrically separating cannulation electrical circuit conductor 808 from infiltration electrical circuit conductor 816, to form a cannulation pad. Insulator layer 812 can comprise a polymer, an elastomer, NEOPRENE®, or the like. An exemplary cannulation pad that can be used or result is shown as pad 104 in FIG. 1. Related useful and optional components, for example, those shown in and described in connection with FIG. 8, can also be incorporated into the cannulation pad.

Simulated access 116 can be electrically attached at one or both ends to cannulation electrical circuit conductor 808, for example, to a top surface 809 of cannulation electrical circuit conductor 808 as shown in FIG. 11. Simulated cannula 121 can be connected at jack 612 to jack 542, connectors 510 and 804 can be connected together, and needle 616 can be used to cannulate simulated access 116. Simulated access 116 can comprise a tube filled with a conductive gel and having magnetic ends magnetically attached to and in electrical communication with cannulation electrical circuit conductor 808. Cannulation electrical circuit conductor 808 can comprise a metal frame, for example, a stainless steel or other metallic frame. Infiltration electrical circuit conductor can comprise a stainless steel or other metallic plate or frame, for example, a double-layer of aluminum foil.

Upon properly cannulating simulated access 116, a cannulation electrical circuit is formed such that electrical current runs through the entire cannulation electrical circuit including through LED 632. As a result, LED 632 lights-up, signaling a proper cannulation. In the event that simulated access 116 is not properly cannulated by needle 616, for example, via an overshoot through or by missing simulated access 116, and needle 616 contacts infiltration electrical circuit conductor 816, buzzer 552 is activated signaling an improper cannulation, an infiltration, or both. Buzzer 552 can be activated whether or not LED 632 is also activated.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such a range is separately disclosed. Where a range of numerical values is recited herein, unless otherwise stated, the range is intended to include the endpoints thereof, and all integers and fractions within the range. It is not intended that the scope of the invention be limited to the specific values recited when defining a range.

All patents, patent applications, and publications mentioned herein are incorporated herein in their entireties, by reference, unless indicated otherwise.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A self-cannulation training system comprising:
   a cannulation pad comprising a cannulation electrical circuit conductor, an infiltration electrical circuit conductor, and an insulating layer electrically insulating the cannulation electrical circuit conductor from the infiltration electrical circuit conductor;
   a simulated access configured to be electrically connected to the cannulation electrical circuit conductor and comprising an outer sheath and an electrically conductive material retained inside the outer sheath;
   a simulated cannula having a length and comprising a cannulation needle at a first end thereof, a cannula connector at a second, opposite end thereof, and an electrical conductor extending along the length and electrically connecting the cannulation needle with the cannula connector;
   a control unit comprising a power source, a first electrical connector for connecting the power source to both the cannulation electrical circuit conductor and the infiltration electrical circuit conductor, and a second electrical connector for connecting the power source to the cannula connector;
   a first indicator in electrical contact with the electrical conductor and configured to be activated when the cannulation needle electrically contacts the cannulation electrical circuit conductor to form a cannulation electrical circuit; and
   a second indicator, different than the first indicator, in electrical contact with the electrical conductor and configured to be activated when the cannulation needle electrically contacts the infiltration electrical circuit conductor to form an infiltration electrical circuit.

2. The self-cannulation training system of claim 1, wherein the first indicator comprises a light indicator and the second indicator comprises a vibrator, a sound alarm, or a combination thereof.

3. The self-cannulation training system of claim 1, wherein the first indicator comprises a red light-emitting diode.

4. The self-cannulation training system of claim 1, wherein the electrical conductor of the simulated cannula comprises a co-axial cable and the cannula connector comprises an RCA cable connector.

5. The self-cannulation training system of claim 1, further comprising a second simulated cannula having a length and comprising a second cannulation needle at a first end thereof, a second cannula connector at a second, opposite end thereof, and a second electrical conductor extending along the length of the second simulated cannula and electrically connecting the second cannulation needle with the second cannula connector.

6. The self-cannulation training system of claim 1, wherein the second electrical conductor of the second simulated cannula comprises a second co-axial cable and the second cannula connector comprises a second RCA cable connector.

7. The self-cannulation training system of claim 1, wherein the simulated access is electrically connected to the cannulation electrical circuit conductor, the first electrical connector connects the power source to both the cannulation electrical circuit conductor and the infiltration electrical circuit conductor, and the second electrical connector connects the power source to the cannula connector.

8. The self-cannulation training system of claim 1, further comprising an armband, wherein the armband and the cannulation pad are configured to be fastened together.

9. The self-cannulation training system of claim 8, further comprising a simulated skin covering, wherein the armband and the simulated skin covering are configured to be fastened together, the simulated skin covering has an outer surface, and the outer surface has a skin tone color.

10. The self-cannulation training system of claim 9, further comprising a wrist band, wherein the wrist band and the control unit are configured to be fastened together, the wrist band comprises a fastener patch including at least one of hook fasteners and loop fasteners, the control unit comprises a unit fastener patch including at least one of hook fasteners and loop fasteners, and the wrist band comprises a battery pocket for accommodating the power source.

11. The self-cannulation training system of claim 1, further comprising an arm cradle, the arm cradle having a through-hole for accommodating an arm, wherein the arm cradle and the cannulation pad are configured to be fastened together, the arm cradle comprises a fastener patch including at least one of hook fasteners and loop fasteners, the cannulation pad comprises a pad fastener patch including at least one of hook fasteners and loop fasteners, the arm cradle further comprises a second fastener patch including at least one of hook fasteners and loop fasteners, and the control unit comprises a fastener patch including at least one of hook fasteners and loop fasteners.

12. The self-cannulation training system of claim 11, wherein the arm cradle comprises a plastic material wrapped with a NEOPRENE® material.

13. The self-cannulation training system of claim 1, wherein the electrically conductive material of the simulated access comprises an electrically conductive gel and the electrically conductive gel comprises the reaction product of borax, glue, salt, and water.

* * * * *